United States Patent [19]

Takamiya

[11] Patent Number: 5,796,968
[45] Date of Patent: Aug. 18, 1998

[54] BUS ARBITER USED IN A COMPUTER SYSTEM

[75] Inventor: Takeshi Takamiya, Tokyo, Japan

[73] Assignee: Kabushiki Kaisha Toshiba, Kawasaki, Japan

[21] Appl. No.: 659,255

[22] Filed: Jun. 7, 1996

[30] Foreign Application Priority Data

Jun. 9, 1995 [JP] Japan .................................. 7-143128

[51] Int. Cl.[6] .................................................. G06F 13/366
[52] U.S. Cl. ................................................................. 395/293
[58] Field of Search ................................. 395/500, 308, 395/290, 292, 293

[56] References Cited

U.S. PATENT DOCUMENTS

| 5,392,436 | 2/1995 | Jansen et al. | 395/725 |
|---|---|---|---|
| 5,467,295 | 11/1995 | Young et al. | 395/200.05 |
| 5,471,590 | 11/1995 | Melo et al. | 395/288 |
| 5,506,972 | 4/1996 | Heath et al. | 395/293 |
| 5,577,214 | 11/1996 | Bhattacharya | 395/287 |
| 5,596,729 | 1/1997 | Lester et al. | 395/308 |

FOREIGN PATENT DOCUMENTS 64-76256  3/1989  Japan .

*Primary Examiner*—Kevin J. Teska
*Assistant Examiner*—Ayni Mohamed
*Attorney, Agent, or Firm*—Finnegan, Henderson, Farabow, Garrett & Dunner, L.L.P.

[57] ABSTRACT

In a computer system where a plurality of bus masters are connected to a bus, a bus arbiter connected to the bus, comprises an arbitration circuit that arbitrates between the bus access request signals from the plurality of bus masters and outputs a bus access grant signal to a single bus master of the plurality of bus masters, unit for holding a value indicating the duration during which the switching of the bus access grant signal is to be inhibited, counting unit capable of counting on the basis of the value held in the holding unit, unit for causing the counting unit to start counting at the time when the arbitration circuit has given a bus access grant signal to a bus master, unit for inhibiting the arbitration circuit from switching the bus access grant signal in the period until the counting has been completed, as long as the bus access request signal from the bus master to which the bus access grant signal has been given remains active, and unit for permitting the arbitration circuit to switch the access grant signal after the counting has been completed.

12 Claims, 9 Drawing Sheets

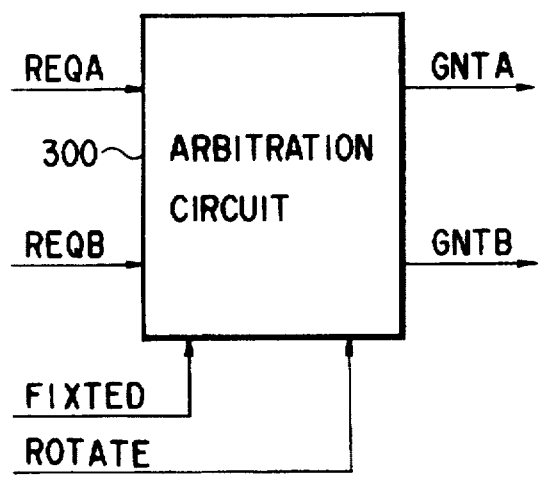
F I G. 3

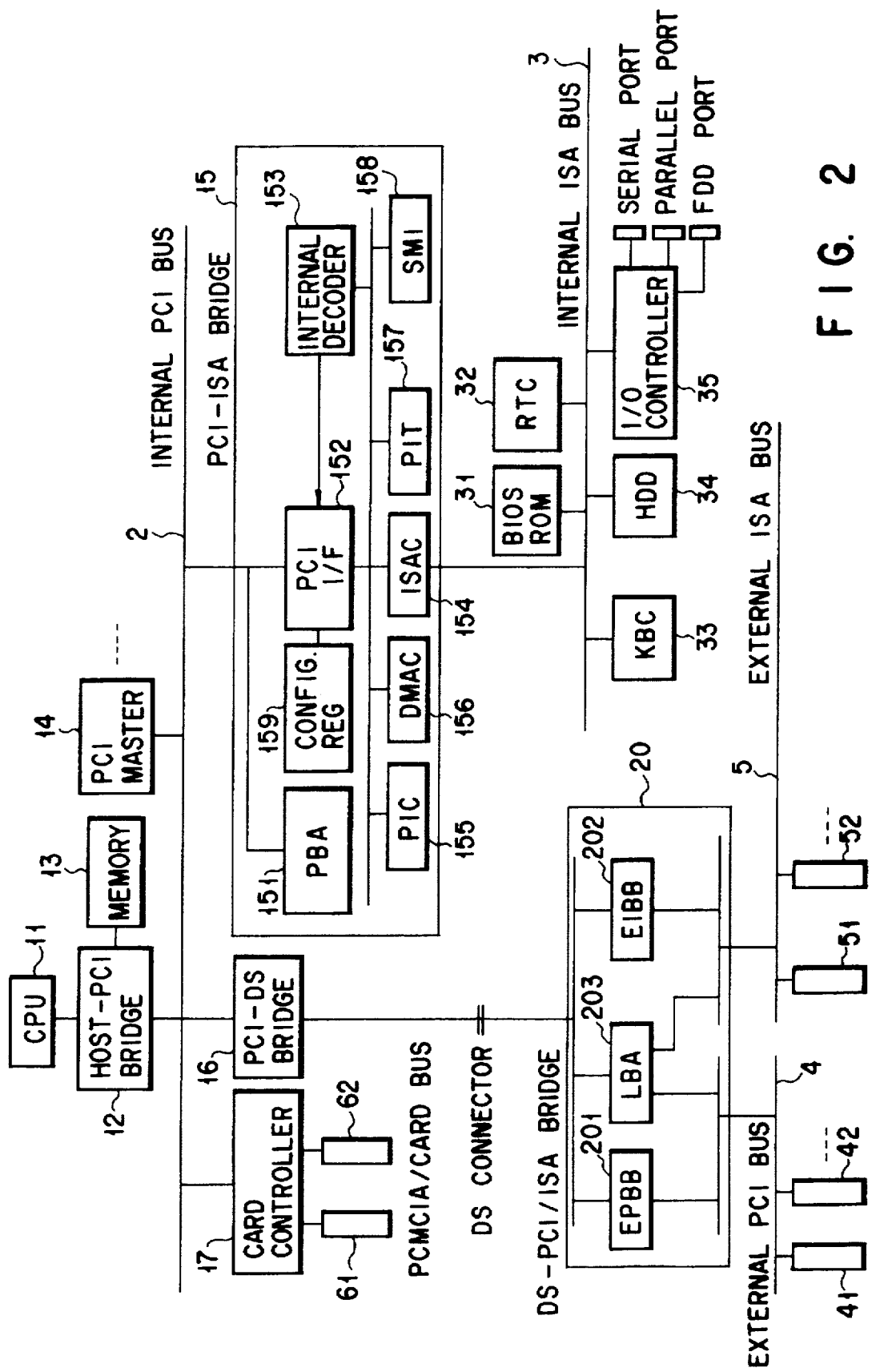
F I G. 2

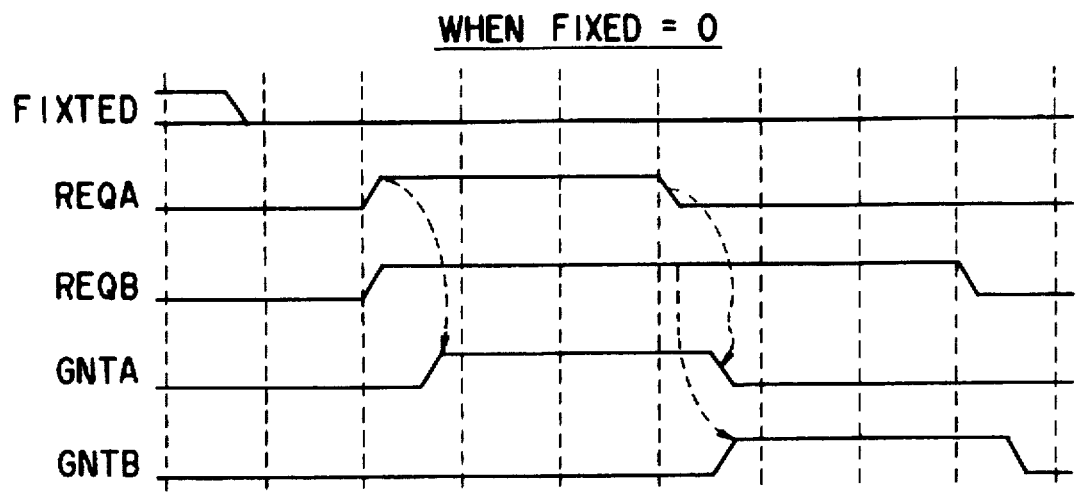
F I G. 4
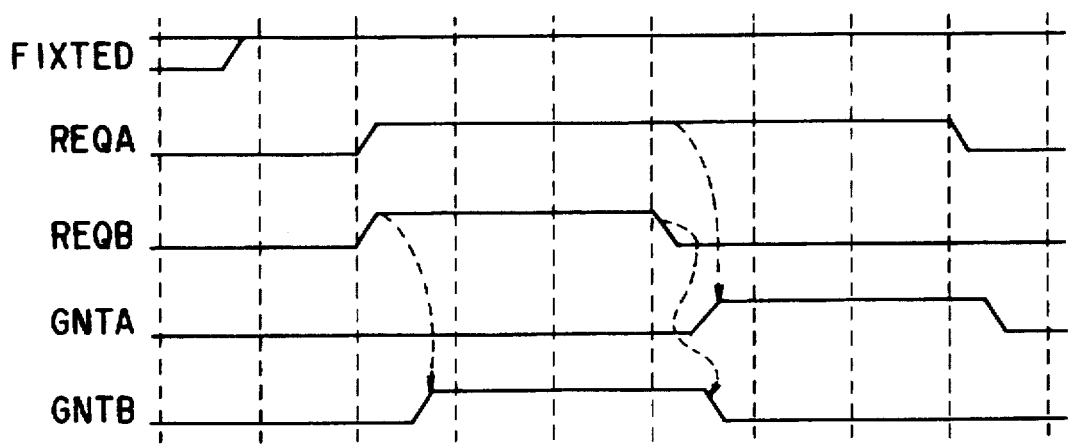
F I G. 5
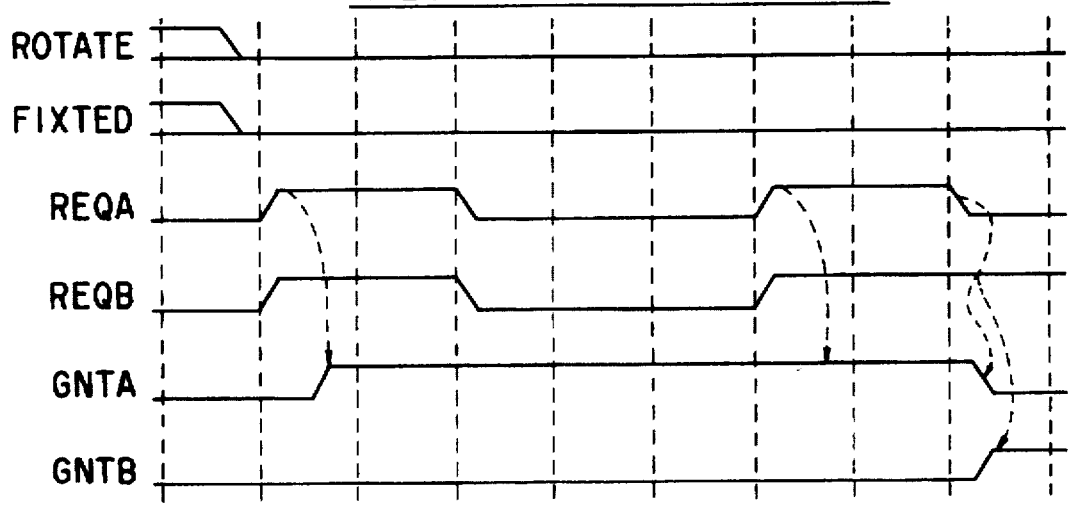
F I G. 6

WHEN ROTATE = 1 & FIXED = 0

| MODE | FIXED BIT BANK 6-0 | ORDER OF PRIORITY HIGH-LOW | MODE | FIXED BIT BANK 6-0 | ORDER OF PRIORITY HIGH-LOW | MODE | FIXED BIT BANK 6-0 | ORDER OF PRIORITY HIGH-LOW |
|---|---|---|---|---|---|---|---|---|
| 0 | 0000000 | HGFEDCBA | 43 | 0101011 | FEGHCDAB | 86 | 1010110 | BACDHGEF |
| 1 | 0000001 | HGFEDCAB | 44 | 0101100 | EFGHDCBA | 87 | 1010111 | ABCDHGEF |
| 2 | 0000010 | HGFECDBA | 45 | 0101101 | EFGHDCAB | 88 | 1011000 | BADCGHFE |
| 3 | 0000011 | HGFECDAB | 46 | 0101110 | EFGHCDBA | 89 | 1011001 | ABDCGHFE |
| 4 | 0000100 | HGEFDCBA | 47 | 0101111 | EFGHCDAB | 90 | 1011010 | BACDGHFE |
| 5 | 0000101 | HGEFDCAB | 48 | 0110000 | FEHGBADC | 91 | 1011011 | ABCDGHFE |
| 6 | 0000110 | HGEFCDBA | 49 | 0110001 | FEHGABDC | 92 | 1011100 | BADCGHEF |
| 7 | 0000111 | HGEFCDAB | 50 | 0110010 | FEHGBACD | 93 | 1011101 | ABDCGHEF |
| 8 | 0001000 | GHFEDCBA | 51 | 0110011 | FEHGABCD | 94 | 1011110 | BACDGHEF |
| 9 | 0001001 | GHFEDCAB | 52 | 0110100 | EFHGBADC | 95 | 1011111 | ABCDGHEF |
| 10 | 0001010 | GHFECDBA | 53 | 0110101 | EFHGABDC | 96 | 1100000 | DCBAFEHG |
| 11 | 0001011 | GHFECDAB | 54 | 0110110 | EFHGBACD | 97 | 1100001 | DCABFEHG |
| 12 | 0001100 | GHEFDCBA | 55 | 0110111 | EFHGABCD | 98 | 1100010 | CDBAFEHG |
| 13 | 0001101 | GHEFDCAB | 56 | 0111000 | FEGHBADC | 99 | 1100011 | CDABFEHG |
| 14 | 0001110 | GHEFCDBA | 57 | 0111001 | FEGHABDC | 100 | 1100100 | DCBAEFHG |
| 15 | 0001111 | GHEFCDAB | 58 | 0111010 | FEGHBACD | 101 | 1100101 | DCABEFHG |
| 16 | 0010000 | HGEFBADC | 59 | 0111011 | FEGHABCD | 102 | 1100110 | CDBAEFHG |
| 17 | 0010001 | HGEFABDC | 60 | 0111100 | EFGHBADC | 103 | 1100111 | CDABEFHG |
| 18 | 0010010 | HGEFBACD | 61 | 0111101 | EFGHABDC | 104 | 1101000 | DCBAFEGH |
| 19 | 0010011 | HGEFABCD | 62 | 0111110 | EFGHBACD | 105 | 1101001 | DCABFEGH |
| 20 | 0010100 | HGEFBADC | 63 | 0111111 | EFGHABCD | 106 | 1101010 | CDBAFEGH |
| 21 | 0010101 | HGEFABDC | 64 | 1000000 | DCBAHGFE | 107 | 1101011 | CDABFEGH |
| 22 | 0010110 | HGEFBACD | 65 | 1000001 | DCABHGFE | 108 | 1101100 | DCBAEFGH |
| 23 | 0010111 | HGEFABCD | 66 | 1000010 | CDBAHGFE | 109 | 1101101 | DCABEFGH |
| 24 | 0011000 | GHFEBADC | 67 | 1000011 | CDABHGFE | 110 | 1101110 | CDBAEFGH |
| 25 | 0011001 | GHFEABDC | 68 | 1000100 | DCBAHGEF | 111 | 1101111 | CDABEFGH |
| 26 | 0011010 | GHFEBACD | 69 | 1000101 | DCABHGEF | 112 | 1110000 | BADCFEHG |
| 27 | 0011011 | GHFEABCD | 70 | 1000110 | CDBAHGEF | 113 | 1110001 | ABDCFEHG |
| 28 | 0011100 | GHEFBADC | 71 | 1000111 | CDABHGEF | 114 | 1110010 | BACDFEHG |
| 29 | 0011101 | GHEFABDC | 72 | 1001000 | DCBAGHFE | 115 | 1110011 | ABCDFEHG |
| 30 | 0011110 | GHEFBACD | 73 | 1001001 | DCABGHFE | 116 | 1110100 | BADCEFHG |
| 31 | 0011111 | GHEFABCD | 74 | 1001010 | CDBAGHFE | 117 | 1110101 | ABDCEFHG |
| 32 | 0100000 | FEHGDCBA | 75 | 1001011 | CDABGHFE | 118 | 1110110 | BACDEFHG |
| 33 | 0100001 | FEHGDCAB | 76 | 1001100 | DCBAGHEF | 119 | 1110111 | ABCDEFHG |
| 34 | 0100010 | FEHGCDBA | 77 | 1001101 | DCABGHEF | 120 | 1111000 | BADCFEGH |
| 35 | 0100011 | FEHGCDAB | 78 | 1001110 | CDBAGHEF | 121 | 1111001 | ABDCFEGH |
| 36 | 0100100 | EFHGDCBA | 79 | 1001111 | CDABGHEF | 122 | 1111010 | BACDFEGH |
| 37 | 0100101 | EFHGDCAB | 80 | 1010001 | BADCHGFE | 123 | 1111011 | ABCDFEGH |
| 38 | 0100110 | EFHGCDBA | 81 | 1010001 | ABDCHGFE | 124 | 1111100 | BADCEFGH |
| 39 | 0100111 | EFHGCDAB | 82 | 1010010 | BACDHGFE | 125 | 1111101 | ABDCEFGH |
| 40 | 0101000 | FEGHDCBA | 83 | 1010011 | ABCDHGFE | 126 | 1111110 | BACDEFGH |
| 41 | 0101001 | FEGHDCAB | 84 | 1010100 | BADCHGEF | 127 | 1111111 | ABCDEFGH |
| 42 | 0101010 | FEGHCDBA | 85 | 1010101 | ABDCHGEF | --- | ------- | -------- |

F I G. 9

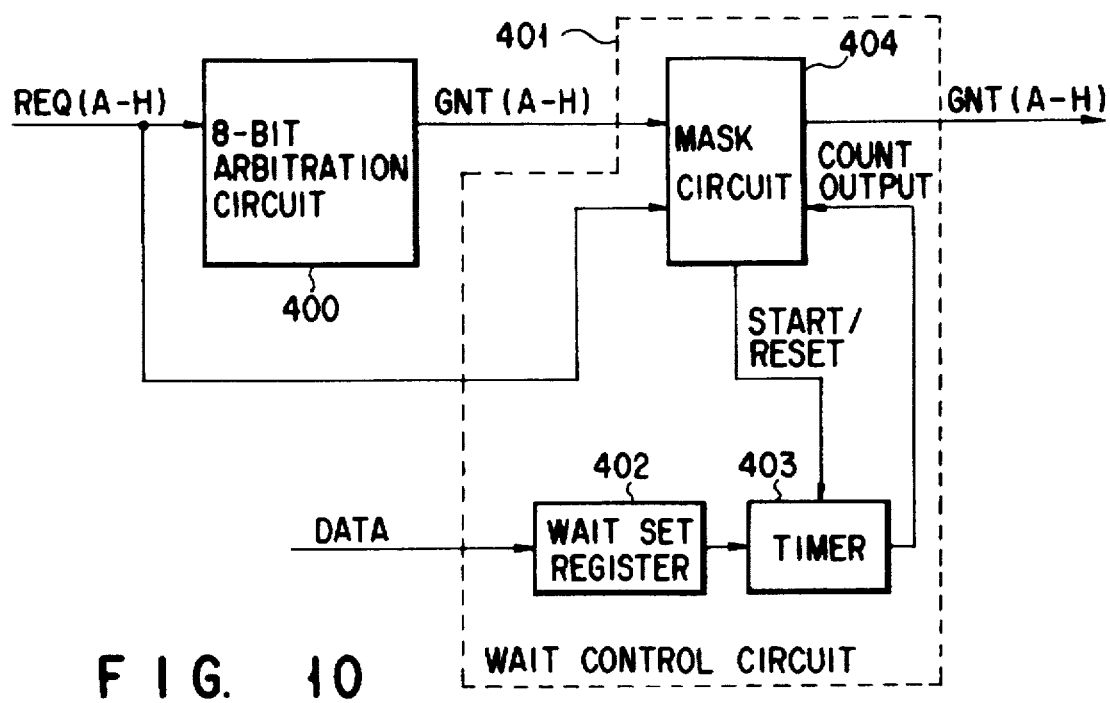
F I G. 10
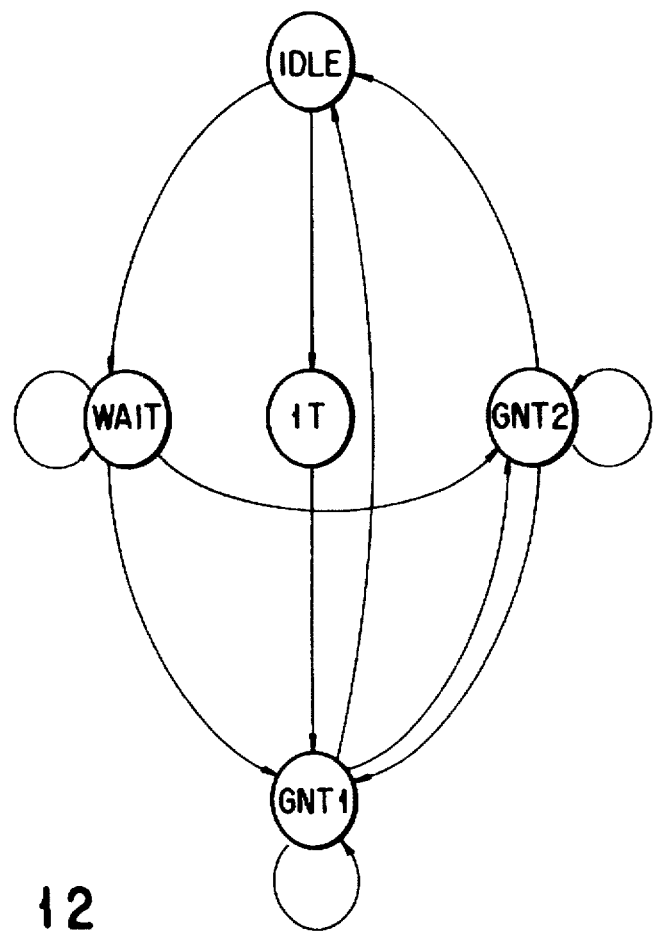
F I G. 12

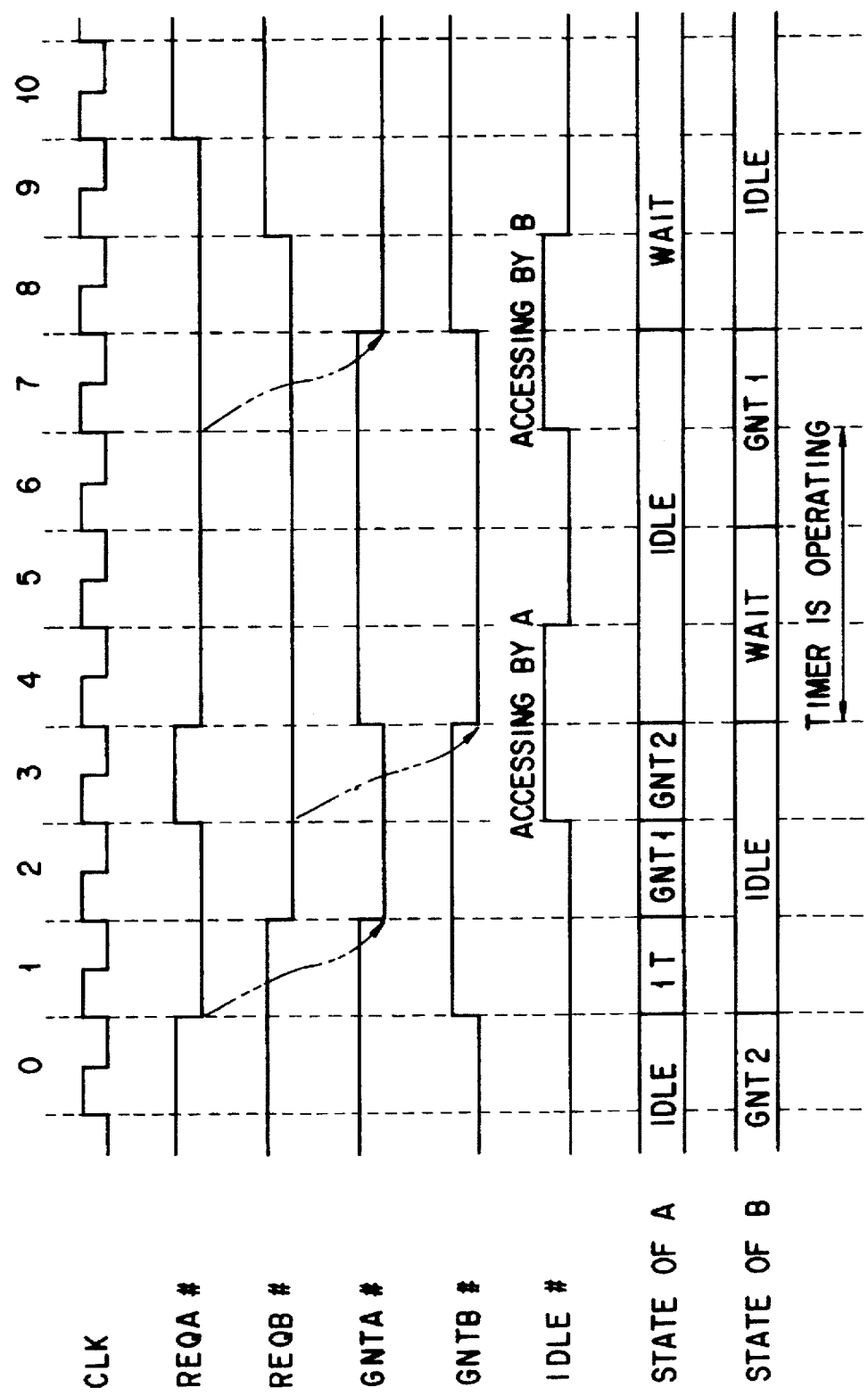
F I G. 11

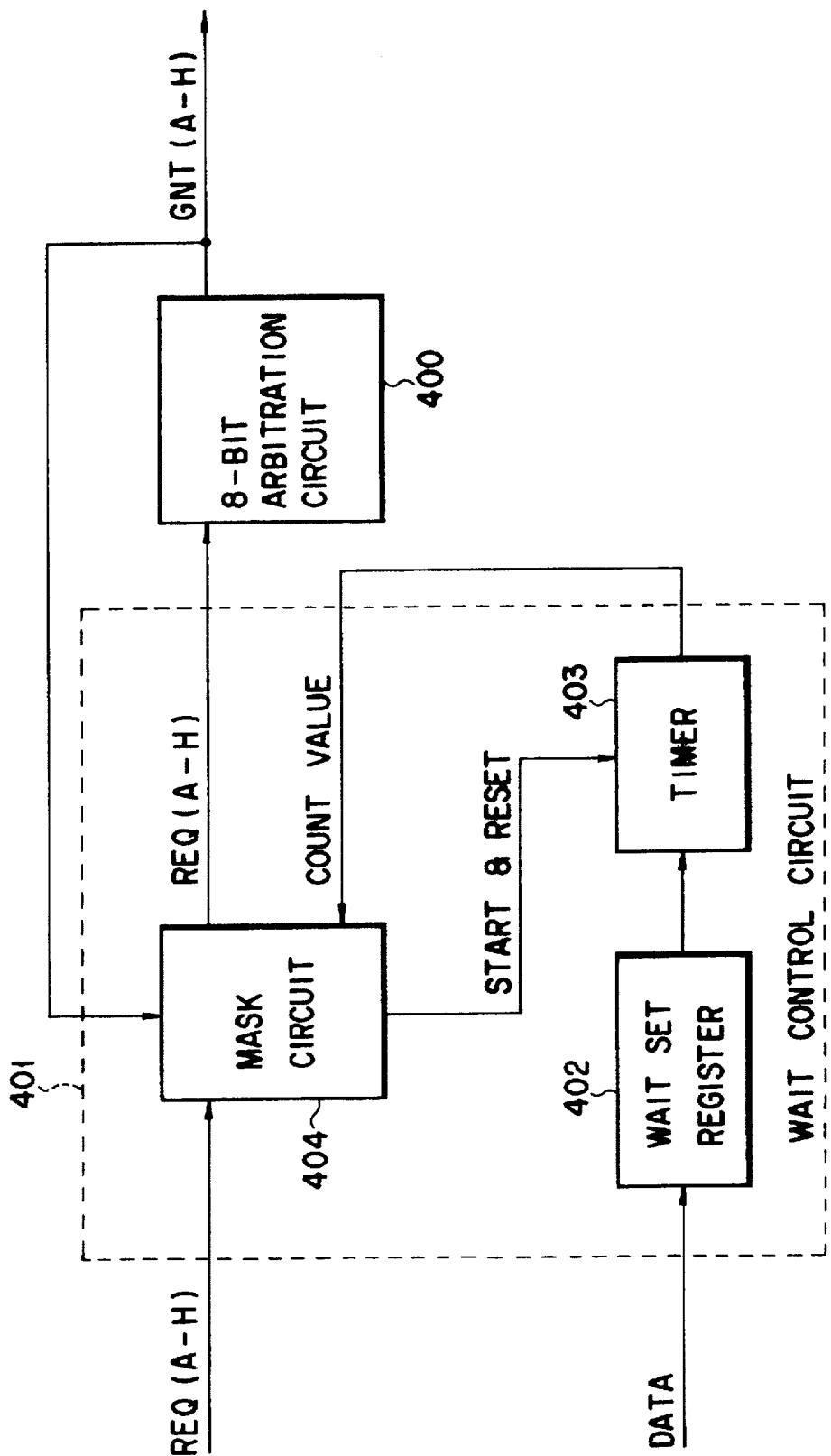
F I G. 13

BUS ARBITER USED IN A COMPUTER SYSTEM

BACKGROUND OF THE INVENTION

1. Field of the Invention

The present invention relates to a bus arbiter used in a computer system, and more particularly to a bus arbiter that arbitrates between the bus access requests from a plurality of bus masters and permits a single bus master to use the bus.

2. Description of the Related Art

ISA (Industry Standard Architecture) buses and EISA (Extended Industry Standard Architecture) buses have been widely used as system buses used for personal computers. Recently, however, PCI (Peripheral Component Interconnect) buses have come into use, centering on desktop personal computers, in order to step up the data transfer speed faster or construct a system architecture independent of processors.

With a PCI bus, all data transfer is based on block transfer. Each block transfer is realized by burst transfer, which enables data to be transferred at a speed of up to 133 Mbytes per second on a PCI bus (in the case of a 32-bit data bus). Therefore, use of PCI buses makes it possible to speed up the data transfer between I/O devices and between the system memory and I/O devices, enhancing the system performance.

For a bus master on a PCI bus to execute data transfer, the bus master must request a PCI arbiter to permit the use of the PCI bus. The PCI arbiter permits one of a plurality of bus masters requesting the use of the PCI bus to use the bus. The bus master permitted to use the bus can start data transfer. The relationship between the bus masters and the PCI bus arbiter in a PCI bus system is shown in FIG. 1

As shown in FIG. 1, each of the bus masters 81 to 86 existing on the PCI bus has a pair of arbitration lines consisting of a bus request signal line (REQ#) and a bus access grant signal line (GNT#). These bus request signal lines (REQ#) and bus access grant signal lines (GNT#) are directly connected to an PCI bus arbiter 91. The bus master that is going to execute data transfer makes the bus request signal line (REQ#) active and waits for the bus access grant signal line (GNT#) to be activated.

From the activated bus request signal lines (REQ#), the PCI bus arbiter 91 selects a single bus request signal line (REQ#) to which the right to use the bus should be given, by the use of a specific algorithm. Then, the arbiter activates a bus access grant signal line (GNT#) corresponding to the bus request signal line (REQ#). The bus master whose bus access grant signal line (GNT#) has been made active makes a frame signal (FRAME#) (not shown) active and starts data transfer with the target. At the same time, the bus master makes the bus request signal line (REQ#) inactive and sets the PCI bus free.

In such bus arbitration, to avoid the competition among bus access requests, it is desirable that the order of priority of giving the right to use the bus should be given to each bus master. This makes it possible to permit the bus master having the highest order of priority to access the bus, when a plurality of bus request signal lines (REQ#) have been made active at the same time.

With only the setting of the order of priority as described above, however, despite the fact that the bus master using the bus continues activating the bus request signal line (REQ#), the bus access grant signal line (GNT#) is changed, when a bus master whose order of priority is higher than that of the present bus master has activated a bus request signal line (REQ#). This may cause problems, including the danger of interrupting the data transfer now in progress.

In the case of a computer system using an ISA bus as well as a PCI bus, the loss is particularly great when the data transfer in execution is interrupted. The reason for this is that a bus master related to the ISA bus cannot perform the process of retrying the data transfer when the data transfer is interrupted.

It can be considered that the problem of changing the bus access grant signal line (GNT#) in the course of data transfer can be solved by providing a mechanism that does not make the PCI bus open to the other bus masters as long as the bus master given the right to use the bus keeps the bus request signal line (REQ#) active.

Use of such a mechanism, however, causes the danger of preventing the other bus masters from accessing the bus forever, when an error has occurred in the bus master using the bus and the bus master has kept the bus request signal line (REQ#) active after the completion of the data transfer, or when the bus master has not made the bus open, although the target device is locked.

SUMMARY OF THE INVENTION

The object of the present invention is to provide a highly reliable bus arbiter that solves not only the problem that data transfer in execution is interrupted as a result of changing the right to use the bus in the middle of operation, but also the problem that a particular bus master occupies the bus unsuitably and consequently the other masters cannot use the bus forever.

According to a first aspect of the present invention, in a computer system where a plurality of bus masters are connected to a bus, a bus arbiter connected to the bus comprises an arbitration circuit that arbitrates between the bus access request signals from the plurality of bus masters and outputs a bus access grant signal to a single bus master of the plurality of bus masters; means for holding a value indicating the duration during which the switching of the bus access grant signal is to be inhibited; counting means capable of counting on the basis of the value held in the holding means; means for causing the counting means to start counting at the time when the arbitration circuit has given a bus access grant signal to a bus master; means for inhibiting the arbitration circuit from switching the bus access grant signal in the period until the counting has been completed, as long as the bus access request signal from the bus master to which the bus access grant signal has been given remains active; and means for permitting the arbitration circuit to switch the access grant signal after the counting has been completed.

According to a second aspect of the present invention, in a computer system where a first bus provided with bus masters capable of retrying data transfer is connected via a bus bridge unit to a second bus provided with bus masters not capable of retrying data transfer, a bus arbiter connected to the first bus, comprises an arbitration circuit that arbitrates between the bus access request signals from the bus masters and outputs a bus access grant signal to a single bus master of the plurality of bus masters means for holding a value indicting the duration during which the switching of the bus access grant signal is to be inhibited; counting means capable of counting on the basis of the value held in the holding means; means for causing the counting means to start counting at the time when the arbitration circuit has given a bus access grant signal to a bus master; means for inhibiting the arbitration circuit from switching the bus access grant signal in the period until the counting has been completed, as long as the bus access request signal from the bus master to which the bus access grant signal has been given remains active; and means for permitting the arbitration circuit to switch the access grant signal after the counting has been completed.

According to a third aspect of the present invention, in a computer system where a PCI (Peripheral Component Interconnect) bus provided with bus masters is connected via a bus bridge unit to an ISA (Industry Standard Architecture) bus provided with bus masters, a bus arbiter connected to the PCI bus, comprises an arbitration circuit that arbitrates between the bus access request signals from the bus masters and outputs a bus access grant signal to a single bus master of the plurality of bus masters means for holding a value indicating the duration during which the switching of the bus access grant signal is to be inhibited; counting means capable of counting on the basis of the value held in the holding means; means for causing the counting means to start counting at the time when the arbitration circuit has given a bus access grant signal to a bus master; means for inhibiting the arbitration circuit from switching the bus access grant signal in the period until the counting has been completed, as long as the bus access request signal from the bus master to which the bus access grant signal has been given remains active; and means for permitting the arbitration circuit to switch the access grant signal after the counting has been completed.

In each of the bus arbiters having the above configurations, the holding means may include a register into which a value indicating the duration can be written in a programmable manner.

Furthermore, the inhibiting means may include a circuit for masking a bus access grant signal outputted from the arbitration circuit. Conversely, the inhibiting means may include a circuit for masking a bus access request signal to be given to the arbitration circuit.

Additionally, the bus arbiter may further comprise failure sensing means that monitors bus cycles in a period during which a bus access signal is given to a bus master and that, when the bus cycles have not continued more than a specific number of cycles, senses that a failure has occurred in the bus master allowed to use the bus, and excludes the bus master from the objects of bus arbitration.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiment of the present invention and, together with the general description given above and the detailed description of the preferred embodiment given below, serve to explain the principles of the present invention in which:

FIG. 2 is a block diagram showing the entire configuration of a computer system according to an embodiment of the present invention;

FIG. 3 is a diagram to help explain the configuration of a 2-input arbitration circuit, a basic component unit of a PCI bus arbiter (PBA) in the computer system of FIG. 2;

FIG. 4 is a timing chart to help explain a first example of the arbitrating operation of the arbitration circuit shown in FIG. 3;

FIG. 5 is a timing chart to help explain a second example of the arbitrating operation of the arbitration circuit shown in FIG. 3;

FIG. 6 is a timing chart to help explain a third example of the arbitrating operation of the arbitration circuit shown in FIG. 3;

FIG. 9 is a table to help explain a method of setting the order of priority by an FIXED signal in the 8-bit arbitration circuit of FIG. 8;

FIG. 10 is a block diagram showing the configuration of a bus arbiter further having a wait control circuit at the back of the 8-bit arbitration circuit of FIG. 8;

FIG. 11 is a timing chart to help explain an example of the arbitrating operation of the bus arbiter of FIG. 10;

FIG. 12 is a pictorial diagram showing the transition from one state to another in the timing chart of FIG. 11;

FIG. 13 is a block diagram of a bus arbiter further having a wait control circuit at the front of the 8-bit arbitration circuit of FIG. 8.

DETAILED DESCRIPTION OF THE PREFERRED EMBODIMENTS

Figure 1:
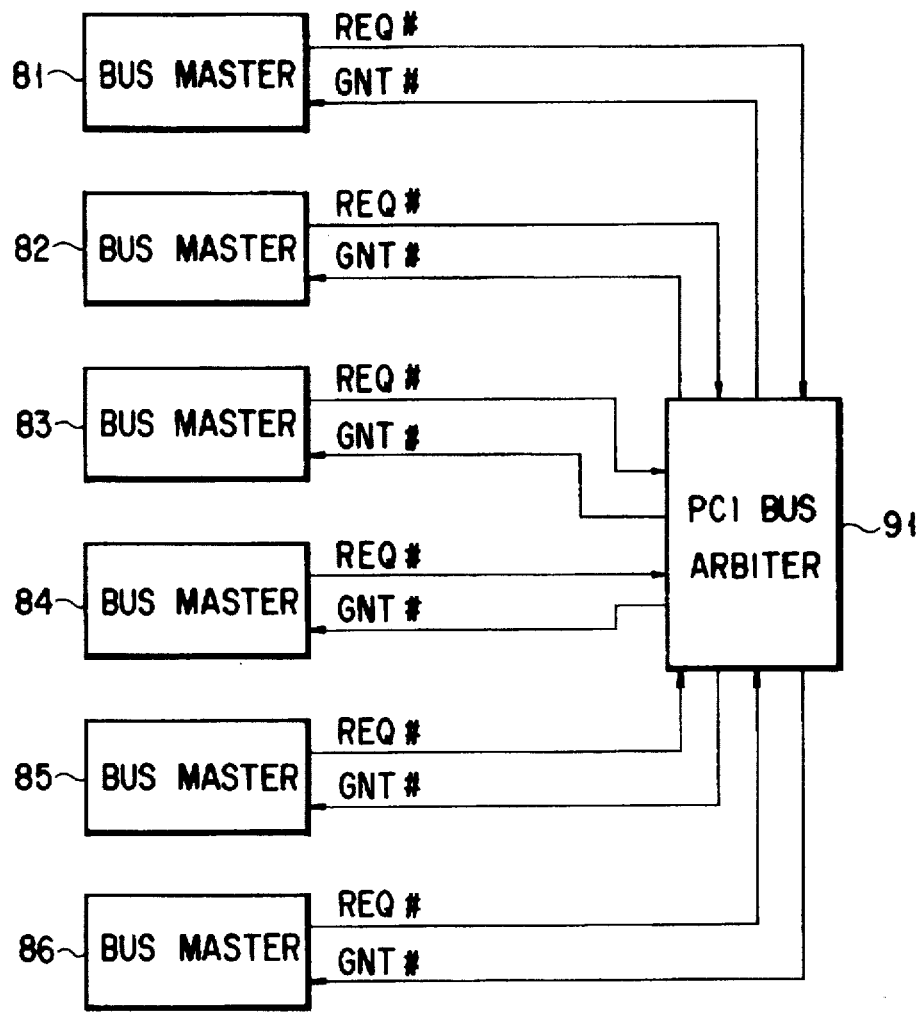
FIG. 1 shows the connection between a conventional bus arbiter and bus masters.

Hereinafter, referring to the accompanying drawings, embodiment of the present invention will be explained.

FIG. 2 shows the configuration of a computer system according to an embodiment of the present invention. The computer system is a portable personal computer of the notebook type or the laptop type, for example. On its system board, there are provided three types of buses, a processor bus 1, an internal PCI bus 2, and an internal ISA bus 3. In a docking station that can be connected to a DS connector of the portable personal computer body, there are provided an external PCI bus 4 and an external ISA bus 5.

On the system board, there are provided a CPU 11, a host/PCI bridge unit 12, a system memory 13, various PCI master devices 14, an internal PCI-ISA bridge unit 15, a PCI-DS (DS: docking station) bridge unit 16, and a PC card controller 17. In the docking station, there are provided a DS-PCI/ISA bridge unit 20, PCI expansion slots 41, 42 into which PCI expansion cards can be installed, and ISA expansion slots 51, 52 into which ISA expansion cards can be installed.

The CPU 11 is realized by an Intel's microprocessor "Pentium". The processor bus 1 directly connected to the input/output pins has a 64-bit data bus.

The system memory 13 is a memory device that stores an operating system, device drivers, application programs to be executed, and processing data, and is composed of a plurality of synchronous DRAMs. The system memory 13 is connected to a host-PCI bridge unit 12 via a special memory bus having a 32-bit or 64-bit data bus. The data bus in the processor bus 1 may be used as the data bus for the memory bus. In this case, the memory bus consists of an address bus and various memory control signal lines.

The host/PCI bridge unit 12 is a bridge LSI that connects the processor bus 1 to the internal PCI bus 2 and functions as one of the bus masters connected to the internal PCI bus 2. The host/PCI bridge unit 12 has the function of bilaterally converting the bus cycle related to the data and address between the processor bus 1 and the internal PCI bus 2 as well as the function of controlling the accessing of the system memory 13 via the memory bus.

The internal PCI bus 2 is an input/output bus of the clock synchronizing type. All of the cycles on the internal PCI bus 2 are in synchronization with the PCI bus clock. The frequency of the PCI Pus clock is 33 MHz at maximum. The internal PCI bus 2 has an address/data bus used in a time sharing manner. The address/data bus has a width of 32 bits.

The data transfer cycle on the PCI bus 2 is composed of an address phase and more than one data phase that follows. In the address phase, an address and a transfer type are specified and in each data phase, 8-bit, 16-bit, 24-bit, or 32-bit data is outputted.

Like the host/PCI bridge unit 12, the PCI master device 14 is one of the bus masters connected to the PCI bus 2 and operates as an initiator or a target. The PCI master device 14 is realized by a graphics controller, for example.

The internal PCI-ISA bridge unit 15 is a bridge LSI connecting the internal PCI bus 2 to the internal ISA bus 3. Connected to the internal ISA bus 3 are a BIOS ROM 31, a real time clock (RTC) 32, a keyboard controller (KBC) 33, a HDD 34, and an I/O port controller 35.

The internal PCI-ISA bridge unit 15 includes a PCI bus arbiter (PBA) 151, a PCI interface (PCI I/F) 152, an internal decoder 153, an ISA controller (ISAC) 154, an interrupt controller (PIC) 155, a DMA controller (DMAC) 156, a system timer (PIT) 157, an SMI generating logic 158, and a configuration register group (CONFIG. REG) 159.

The PCI bus arbiter (PBA) 151 arbitrates the right to use the PCI bus 2 between all of the bus masters connected to the internal PCI bus 2. For the arbitration, the signal lines (bus request signal REQ# lines and grant signal GNT# lines, each pair of which is allocated to each bus master device) on the internal PCI bus 2 are used.

The bus request signal REQ# is a signal to tell the PCI bus arbiter (PBA) 151 that the corresponding device is requesting the use of the internal PCI bus 2. The grant signal GNT# is a bus access grant signal to inform the device that has issued the bus request signal REQ# of permission to use the bus.

The PCI bus arbiter (PBA) 151 is connected to all of the bus masters on the internal PCI bus 2 using the bus request signal REQ# lines and grant signal GNT# lines on a point-to-point basis. The arbitration of the right to use the bus is controlled intensively by the PCI bus arbiter (PBA) 151. The PCI bus arbiter (PBA) 151 has the following four features:

1. To arbitrate between up to eight bus request signals REQ#;
2. To be able to change the order of priority of giving the grant signal GNT#;
3. To be able to set the duration (waiting time) during which the switching of the grant signal GNT# is to be inhibited; and
4. To have a failure sensing circuit.

These functions account for the features of the present embodiment and the details of them will be explained later by reference to FIG. 3 and subsequent figures.

The PCI interface 152 exchanges addresses, data, commands, and various status signals with the internal PCI bus 152. The internal decoder 153 decodes addresses to select one of the devices (the interrupt controller 155, DMA controller 156, system timer 157, SMI generating logic 158, and configuration register group 159) contained in the PCI-ISA bridge 15 and one of the devices (the BIOS ROM 31, real time clock 32, keyboard controller 33, HDD 34, and I/O port controller 35) on the internal ISA bus 3. What are decoded by the internal decoder 153 include the I/O address, memory address, and configuration address outputted onto the PCI bus 2.

The ISA controller 154 generates an ISA bus cycle for accessing a memory and an I/O on the internal ISA bus 3. The configuration register group 159 is a register group that can be read from and written into in the configuration cycle. In the register group, the control data for controlling the operation of each device in the bridge 15 is set.

The PCI-DS bridge unit 16 is a bridge LSI that connects the internal PCI bus 2 to a docking bus equivalent to the PCI bus drawn into the docking station. The PC card controller 17 is one of the PCI bus masters and controls the PC cards installed in the card slots 61, 62 complying with the PCMCIA/Card bus specifications.

The DS-PCI/ISA bridge unit 20 is a bridge LSI that connects a docking bus (equivalent to the PCI bus) drawn from the computer body into the docking station via the DS connector to the external PCI bus 4 and external ISA bus 5. Like the PC card controller 17, the DS-PCI/ISA bridge unit 20 is one of the PCI bus masters.

The DS-PCI/ISA bridge unit 20 is provided with an external PCI bus bridge (EPBB) 201, an external ISA bus bridge (EIBB) 202, and a local bus arbiter (LBA) 203.

The EPBB 201 receives the memory cycle and I/O cycle generated on the internal PCI bus 2 by way of the PCI-DS bridge 16 and transmits them onto the external PCI bus 4. When the right to use the bus has been given to a PCI expansion card on the external PCI bus 4, the EPBB 201 causes the bus transaction on the external PCI bus 4 to appear on the docking bus.

The EIBB 202 receives the memory cycle and I/O cycle generated on the internal PCI bus 2 via the PCI-DS bridge 16, performs protocol conversion of them, and transmits the resulting signals onto the external ISA bus 5. When the right to use the bus has been given to an expansion ISA master card on the external ISA bus 5, the EIBB 202 causes the bus transaction on the external ISA bus 5 to appear on the docking bus.

The LBA 203 arbitrates between the bus use request from the PCI expansion card on the external PCI bus 4 and the bus use request from the ISA expansion card on the expansion ISA bus 5.

Now, a concrete configuration of the PCI bus arbiter (PBA) 151 will be explained.

FIG. 3 shows an arbitration circuit with two REQ inputs used as a unit constituting the PCI bus arbiter (PBA) 151.

The arbitration circuit 300 with two REQ inputs has four inputs and two outputs. The following signals are supplied to the four inputs:

REQA: a bus request signal from bus master A
REQB: a bus request signal from bus master B
FIXED: a signal fixing the order of priority of grant switching
ROTATE: a signal dynamically toggling the order of priority of grant switching The arbitration circuit 300 supplies the following signals at the two outputs:

GNTA: a grant (bus access grant) signal to REQA
GNTB: a grant (bus access grant) signal to REQB The operation timing of the 2-input arbitration circuit 300 of FIG. 3 is shown in FIGS. 4 to 7. Here, REQA, REQB, GNTA, and GNTB are such signals as are active for "1" and inactive for "0".

FIG. 4 shows the operation timing for FIXED="0".

When FIXED="0", the order of priority of REQA is set higher than that of REQB. Accordingly, when two bus request signals REQA and REQB have been generated simultaneously as shown in the figure, the grant signal GNTA corresponding to the higher order of priority REQA is set active "1". When the REQA has been made inactive "0", GNTA becomes inactive "0". At this time, if the REQB is active "1", the grant signal GNTB corresponding to REQB will be set active "1".

FIG. 5 shows the operation timing for FIXED="1".

When FIXED="1", the order of priority between REQA and REQB is the reverse of that for FIXED="0" and the order of priority of REQA is set lower than that of REQB. Consequently, when the two bus request signals REQA and REQB have been generated simultaneously as shown in the figure, the grant signal GNTB corresponding to REQB having the higher order of priority is set active "1". When the REQB has been made inactive "0", GNTB becomes inactive "0". At this time, if the REQA is active "1", the grant signal GNTA corresponding to REQA will be set active "1".

FIG. 6 shows the operation timing for FIXED="0" and ROTATE="0".

When ROTATE="0", the order of priority will not be toggled between REQA and REQB. For this reason, as with the operation timing for FIXED="0" shown in FIG. 4, when the two bus request signals REQA and REQB have been generated simultaneously, the grant signal GNTA corresponding to REQA having the higher order of priority is set active "1". Even after the grant signal GNTA has been set active "1", the relationship in the order of priority between REQA and REQB remains unchanged. Therefore, only when REQA is inactive "0" and REQB is active "1", GNTB will become active "1".

Figure 7:
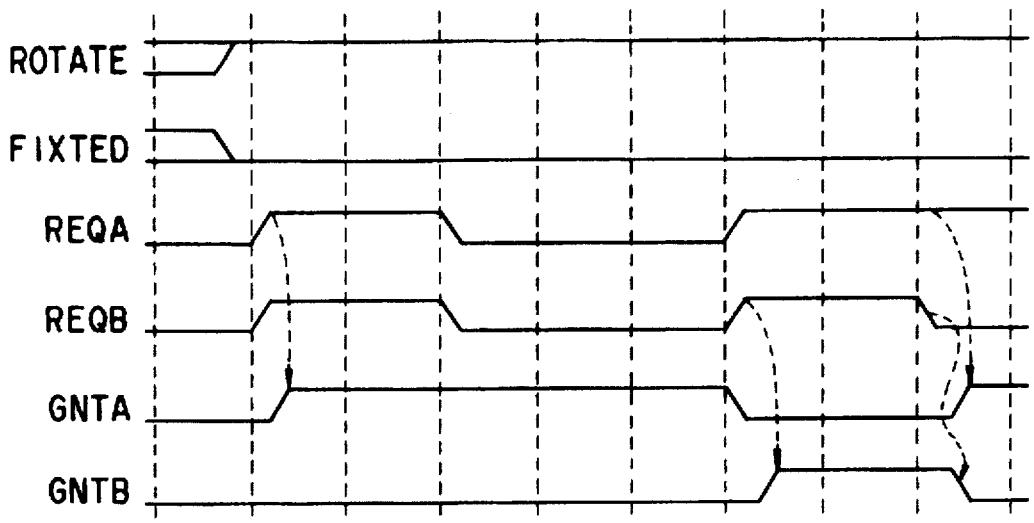
FIG. 7 is a timing chart to help explain a fourth example of the arbitrating operation of the arbitration circuit shown in FIG. 3.

FIG. 7 shows the operation timing for FIXED="0" and ROTATE="1".

When ROTATE="1", the order of priority between REQA and REQB is toggled dynamically. Accordingly, immediately after the grant signal GNTA corresponding to REQA having the higher order of priority has been set active "1", the relationship in the order of priority between REQA and REQB is changed, with the result that the order of priority of REQB is higher than that of REQA. Therefore, when REQA and REQB have been generated simultaneously for the first time, GNTA will become "1". Then, when REQA and REQB has been generated simultaneously for the second time, GNTB will become "1".

Figure 8:
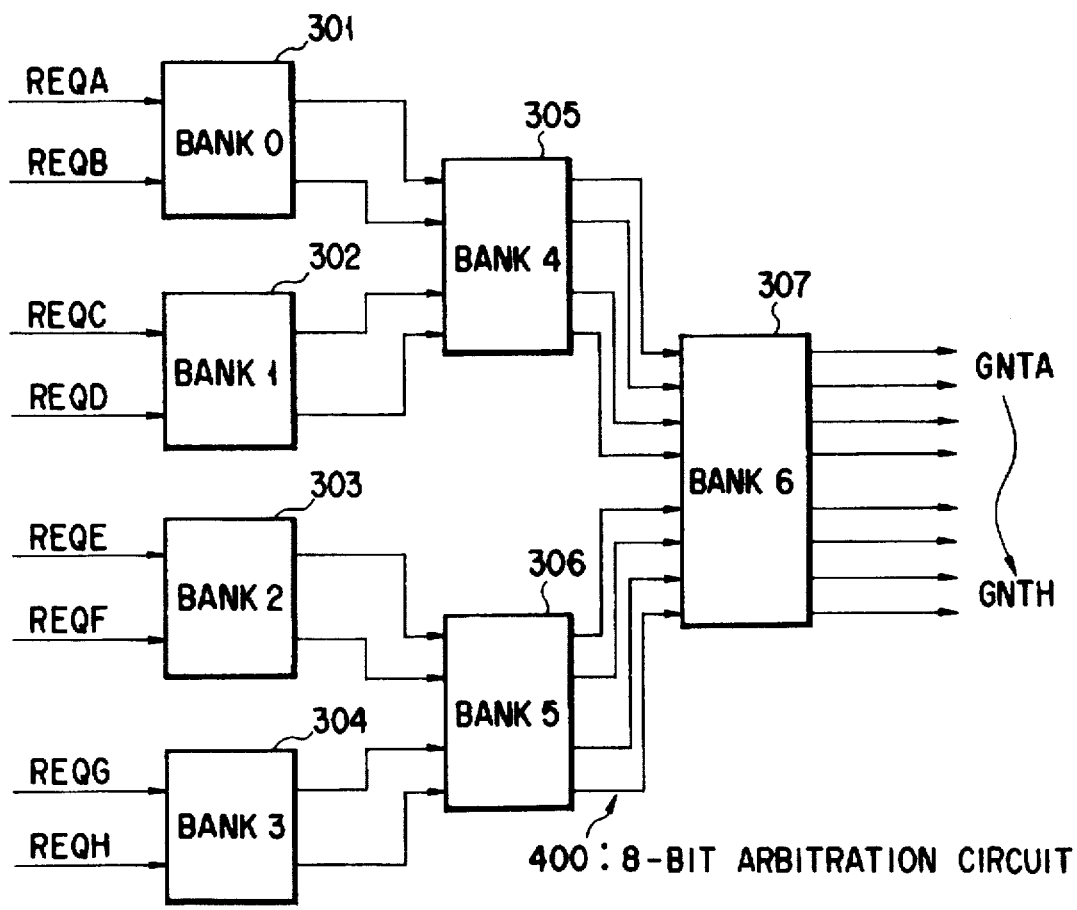
FIG. 8 shows the configuration of an 8-bit arbitration circuit constructed using the arbitration circuit shown in FIG. 3.

FIG. 8 shows the configuration of an 8-bit arbitration circuit with eight REQ inputs that is constituted on the basis of the 2-input arbitration circuit 300 of FIG. 3.

The 8-bit arbitration circuit 400 has eight REQ inputs (REQA to REQH) and eight GNT outputs (GNTA to GNTH) corresponding to the eight REQ inputs. The 8-bit arbitration circuit 400 is composed of seven banks 301 (BANK0) to 307 (BANK6).

Each of the banks 301 to 304 is composed of an arbitration circuit 300 with two REQ inputs explained in FIG. 3. Although the bank 305 is an arbitration circuit with four REQ inputs which is an expansion of the arbitration circuit 300 with two REQ inputs, it does not arbitrate between the four REQs separately, but selects one of two REQ pairs (the outputs of the banks 301 and 302). Similarly, the bank 306 is an arbitration circuit with four REQ inputs which is an expansion of the arbitration circuit 300 with two REQ inputs. It does not arbitrate between the four REQs separately, but selects one of two REQ pairs (the outputs of the banks 303 and 304). The bank 307 is an arbitration circuit with eight REQ inputs which is a further expansion of the arbitration circuit 300 with two REQ inputs. It does not arbitrate between the eight REQs separately, but selects one of two REQ sets (the outputs of the banks 305 and 306).

Each of the banks 301 to 307 has the inputs for FIXED and ROTATE signals explained in FIG. 3, which enables the degree of priority to be fixed or toggled bank by bank.

FIG. 9 shows the relationship between the 7-bit FIXED signals given to the banks 301 to 307 and the degree of priority given to REQA to REQH.

In FIG. 9, it is assumed that bank 301 is given the lowest significant bit in a 7-bit FIXED signal and each of bank 302 to bank 307 is given a bit whose order is one bit higher than the preceding one.

For example, when the 7-bit FIXED signal is "0000000" (mode 0), REQH has the highest order of priority and the order of priority descends in this order: REQG, REQF, REQE, REQD, REQC, REQB, and REQA.

Furthermore, when the 7-bit FIXED signal is "0000001" (mode 1), the order of priority between REQB and REQA is reversed. The order of priority descends in this order: REQH, REQG, REQF, REQE, REQD, REQC, REQA, and REQB.

In this way, 128 types of the order of priority can be determined by the 7-bit FIXED signal. In the case of a bank for which ROTATE is set at "1", the order of priority of the bank changes each time the GNT output is supplied.

FIG. 10 shows a concrete circuit configuration of a bus arbiter that realizes the efficient switching of the right to use the bus.

Specifically, a wait control circuit 401 is provided in the stage following the 8-bit arbitration circuit 400 explained in FIG. 8. When a bus master whose order of priority is higher than the bus master now permitted to use the bus has requested the bus use, the wait control circuit 401 prevents the switching of the right to use the bus (the switching of GNT), provided that the bus master allowed to use the bus has not stopped the request of the bus use and a specific waiting time has not elapsed since the bus use was permitted. Conversely, when the specific waiting time has elapsed, the switching of the right to use the bus is permitted readily.

The wait control circuit 401 is composed of a wait set register 402, a timer 403, and a mask circuit 404.

The wait set register 402 is a register that can be read from and written into by the CPU 11 and is realized as, for example, one of the configuration register groups 159 in FIG. 2. When the system power is turned on, the time data indicating the length of waiting time during which the right to use the bus is to be inhibited from being switched from the bus master allowed to use the bus to another bus master is set in the wait set register 402.

The waiting time set in this case has such a length that the data transfer is not interrupted as much as possible and the time during which the bus is occupied by a particular bus master does not last extremely.

The timer 403 is a down counter that uses the value of the time data set in the wait set register 402 as an initial value and decrements the value one by one. The timer 403 starts to count in response to the start signal from the mask circuit 404. The count in the timer 403 is reset by the reset signal from the mask circuit 404.

The mask circuit 404 monitors the eight REQ inputs (REQA to REQH) and eight GNT outputs (GNTA to GNTH) of the 8-bit arbitration circuit 400. When a REQ and a GNT corresponding to the REQ both go active, the mask circuit generates a start signal and causes the timer 403 to start counting. During the waiting period until the count output of the timer 403 becomes "0", the mask circuit 404 masks the grant outputs from the 8-bit arbitration circuit 400 to the remaining masters, as long as the REQ from the master currently having GNT remains active. As a result, even if REQ is generated from a bus master whose order of priority is higher than the master currently having GNT, the switching of GNT due to the generated REQ can be prevented.

When the count output has become "0", the waiting period ends. At this time, the mask circuit 404 not only masks the GNT output to the bus master having GNT until then, but also invalidates the masking of the grant outputs to the remaining bus masters. Accordingly, the PCI bus 2 can be released from the bus master having the GNT during the waiting period, and the right to use the bus can be given to another bus master.

When REQ from the bus master having GNT until then has become inactive before the count output of the timer 403 becomes "0", the mask circuit 404 resets the timer 403.

With the configuration of FIG. 10, during the waiting period specified by the time data set in the wait set register 402, the switching of GNT to another bus master is prevented, as long as REQ from the master currently having GNT remains active. When the waiting period has elapsed, the switching of GNT is permitted.

Therefore, it is possible to avoid the interruption of data transfer in progress due to changing the right to use the bus in the middle. Additionally, it is possible to avoid the situation where another bus master cannot use the bus forever, because a particular bus master continues occupying the bus unsuitably.

A system in which an ISA bus is connected to a PCI bus via a bus bridge as shown in the embodiment (see FIG. 2) has the great advantage of being able to avoid the situation where the retrying process cannot be performed as a result of the interruption of the data transfer being executed by a bus master related to the ISA bus.

FIG. 11 shows an example of the arbitration operation of the bus arbiter in FIG. 10.

It is assumed that in the example of FIG. 11, the order of priority of REQA is higher than that of REQB. The signals marked with the symbol "#" indicate "0" active.

As described above, while the timer 403 in the wait control circuit 401 is in operation (during a waiting period), GNT# remains unchanged as long as REQ# is kept active, regardless of the order of priority. In the example of FIG. 11, while bus master B having the lower order of priority is using the bus, even if bus master A generates REQA# during a waiting period, GNTB# is kept active.

Here, IDLE# is a signal that becomes "0" only when both of the frame signal FRAME# and the initiator ready IRDY# on the PCI bus are at "1". When IDLE# is at "0", the switching of GND is forced to wait for 1T (1 cycle=1 CYC).

As shown in FIG. 11, at clock 1 of the clock signal CLK, REQA# having the higher order of priority becomes active. At clock 2, GNTA# goes active in response to the fact that REQA# has gone active. Furthermore, at clock 2, although REQB# becomes active, GNT is not switched, because the order of priority of REQA# is higher. At clock 3, REQB# remains active, whereas REQA# having the higher order of priority becomes inactive.

Although the timer 403 actually starts to count because both of REQA# and GNTA# go active at the beginning of clock 2, the counting operation will end right away because REQA# becomes inactive at the beginning of clock 3.

At clock 4, GNT is switched in response to the fact that only REQB# goes active. Because at the beginning of clock 4, both of REQA# and GNTA# become active, the timer 403 starts to count. Furthermore, at clock 4, although REQA# having the higher order of priority goes active again, the switching of GNT is inhibited until the beginning of clock 7 has been reached.

At the beginning of clock 7, the timer 403 has finished counting and the switching of GNT is permitted. REQA# having the higher order of priority remains active. At clock 8, because the counting operation at the timer 403 has been completed and REQA# is active, GNT is switched.

In cycle 3 and cycle 4 where IDLE# is at "1", bus master A corresponding to REQA# and GNTA# accesses the PCI bus. In cycle 7 and cycle 8, bus master B corresponding to REQB# and GNTB# accesses the PCI bus.

The meanings of each state of bus master A and bus master B are as follows:

IDLE: a state where no GNT is outputted

WAIT: a state where GNT is outputted, but the PCI bus is occupied by another bus master 1T: a state where the switching is forced to wait for 1T when the switching of GNT has been generated with PCI bus lying idle GNT1: a state where the bus master keeps REQ active and possesses GNT GNT2: a state where the bus master keeps REQ inactive but possesses GNT In the states of WAIT, GNT1, and GNT2, the GNT signal is kept active.

For reference, FIG. 12 pictorially shows the transition of the above individual states.

FIG. 13 is a modification of the configuration of the bus arbiter of FIG. 10. While in FIG. 10, the wait control circuit 401 is provided in the stage following the 8-bit arbitration circuit 400 to mask GNT outputs, the wait control circuit 401 in FIG. 13 is provided in the stage preceding the 8-bit arbitration circuit 400 to mask REQ inputs.

In FIG. 13, the mask circuit 404 monitors the eight REQ inputs (REQA to REQH) and eight GNT outputs (GNTA to GNTH) of the 8-bit arbitration circuit 400. When REQ and GNT corresponding to the REQ both become active, the mask circuit 404 generates a start signal and causes the timer 403 to start to count. During the waiting period until the count output of the timer 403 becomes "0", the mask circuit 404 masks the REQ inputs to the 8-bit arbitration circuit 400 for the remaining masters, as long as the REQ from the master now possessing GNT remains active. As a result, even if REQ is generated from a bus master whose order of priority is higher than that of the master currently possessing GNT, the switching of GNT due to the generated REQ can be prevented.

When the count output has become "0", the waiting period ends. At this time, the mask circuit 404 not only masks the REQ input from the bus master possessing GNT until then, but also invalidates the masking of the REQ inputs from the remaining bus masters. Accordingly, the PCI bus 2 can be released from the bus master possessing GNT during the waiting period, and the right to use the bus can be given to another bus master.

Figure 14:
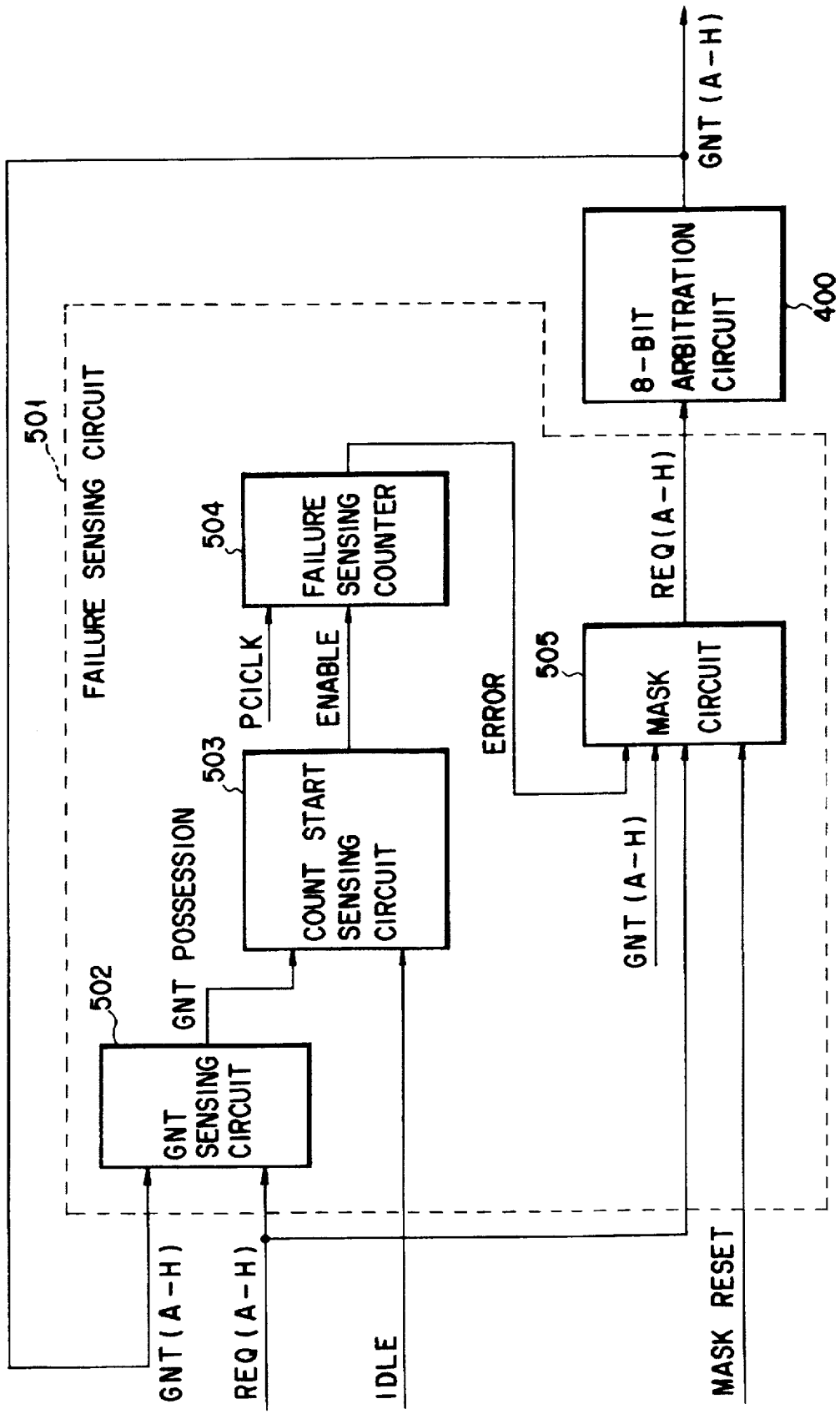
FIG. 14 is a block diagram of a bus arbiter having a failure sensing circuit added to the 8-bit arbitration circuit of FIG. 8.

FIG. 14 shows a concrete configuration of a failure sensing circuit additionally provided on the bus arbiter of FIG. 10 or FIG. 13.

When the bus master keeps REQ active and continues possessing GNT and the IDLE state (a state where no bus access is generated) lasts for 20 cycles or more, for example, the failure sensing circuit 501 judges that a failure has occurred in the bus master and from this time on, excludes REQ from the bus master from arbitration.

The failure sensing circuit 501 is composed of a GNT possession sensing circuit 502, a count start sensing circuit 503, a failure sensing counter 504, and a mask circuit 505.

The GNT possession sensing circuit 502 monitors the eight REQ inputs (REQA to REQH) and eight GNT outputs (GNTA to GNTH) of the 8-bit arbitration circuit 400. When REQ and GNT corresponding to the REQ both become active, the GNT possession sensing circuit judges that a bus master has possessed GNT and generates a GNT possession signal. The GNT possession signal is sent to the count start sensing circuit 503.

The count start sensing circuit 503 verifies the bus cycle on the PCI bus 2 in response to the GNT possession signal. If verifying that no bus cycle is executed (that is, both of FRAME# and IRDY# are inactive), the count start sensing circuit will output a counter enable signal. If sensing that a bus cycle is started, the count start sensing circuit 503 will stop the generation of a counter enable signal.

The failure sensing counter 504 counts the number of PCI clocks during the time from when a counter enable signal was generated until the enable signal is stopped and generates an error signal at the time when the time equivalent to 20 cycles has elapsed. The mask circuit 505 stores REQ from the bus master possessing GNT when an error signal is generated and immediately after this, masks the REQ. As a result, from this time on, the bus master possessing GNT when the error signal was generated is excluded from the objects of bus arbitration. The masking of REQ by the mask circuit 505 is canceled by the mask reset signal (MASK Reset).

Use of the failure sensing circuit 501 makes it possible to avoid the situation where another bus master cannot access the bus forever, even when the bus master in which an error has occurred occupies the bus unsuitably.

The failure sensing circuit 501 can be connected to, for example, the stage preceding the wait control circuit 401 of FIG. 13 or between the wait control circuit 401 and the 8-bit arbitration circuit 400. Furthermore, the failure sensing circuit may be provided in the state preceding the 8-bit arbitration circuit 400 of FIG. 10.

As explained above, with the present invention, the waiting time during which the switching of the right to use the bus can be determined. During the wait period, as long as the bus access request signal is kept active, the right to use the bus is not switched, even when a bus access request signal has been generated from a bus master whose order of priority is higher than that of the bus master currently possessing the right to use the bus. When the waiting time has elapsed, for example, the bus access request signal from the bus master possessing the right to use the bus is invalidated forcibly by the mask circuit, which makes the bus open, thereby making it possible to give the right to use the bus to another bus master.

Accordingly, it is possible to solve not only the problem that data transfer in progress is interrupted due to changing the right to use the bus in the middle of operation, but also the problem that another bus master cannot use the bus forever because a particular bus master continues occupying the bus unsuitably.

In a computer system using an ISA bus in addition to a PCI bus, it is possible to avoid the situation where the data transfer by a bus master related to the ISA bus is interrupted and the data transfer cannot be retried.

Furthermore, use of a failure sensing circuit prevents the occurrence of the situation where another bus master cannot access the bus forever, even when the bus master in which an error has occurred continues occupying the bus unsuitably.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. In a computer system where a plurality of bus masters are connected to a bus, a bus arbiter connected to said bus, comprising:

an arbitration circuit that arbitrates between the bus access request signals from said plurality of bus masters and outputs a bus access grant signal to a single bus master of said plurality of bus masters;

means for holding a value indicating the duration during which the switching of said bus access grant signal is to be inhibited;

counting means capable of counting on the basis of the value held in said holding means;

means for causing said counting means to start counting at the time when said arbitration circuit has given a bus access grant signal to a bus master;

means for inhibiting said arbitration circuit from switching the bus access grant signal in the period until said counting has been completed, as long as the bus access request signal from said bus master to which the bus access grant signal has been given remains active; and means for permitting said arbitration circuit to switch the access grant signal after said counting has been completed;

wherein said inhibiting means includes a circuit for masking a bus access grant signal outputted from said arbitration circuit.

2. A bus arbiter according to claim 1, wherein said holding means includes a register into which a value indicating said duration can be written in a programmable manner.

3. A bus arbiter according to claim 1, wherein said inhibiting means includes a circuit for masking a bus access request signal to be given to said arbitration circuit.

4. A bus arbiter according to claim 1, further comprising failure sensing means that monitors bus cycles in a period during which a bus access signal is given to a bus master and that, when the bus cycles have not continued more than a specific number of cycles, senses that a failure has occurred in the bus master allowed to use the bus, and excludes the bus master from the objects of bus arbitration.

5. In a computer system where a first bus provided with bus masters capable of retrying data transfer is connected via a bus bridge unit to a second bus provided with bus masters not capable of retrying data transfer, a bus arbiter connected to said first bus, comprising:

an arbitration circuit that arbitrates between the bus access request signals from said bus masters and outputs a bus access grant signal to a single bus master of said plurality of bus masters;

means for holding a value indicting the duration during which the switching of said bus access grant signal is to be inhibited;

counting means capable of counting on the basis of the value held in said holding means;

means for causing said counting means to start counting at the time when said arbitration circuit has given a bus access grant signal to a bus master;

means for inhibiting said arbitration circuit from switching the bus access grant signal in the period until said counting has been completed, as long as the bus access request signal from said bus master to which the bus access grant signal has been given remains active; and means for permitting said arbitration circuit to switch the access grant signal after said counting has been completed;

wherein said inhibiting means includes a circuit for masking a bus access grant signal outputted from said arbitration circuit.

6. A bus arbiter according to claim 5, wherein said holding means includes a register into which a value indicating said duration can be written in a programmable manner.

7. A bus arbiter according to claim 5, wherein said inhibiting means includes a circuit for masking a bus access request signal to be given to said arbitration circuit.

8. A bus arbiter according to claim 5, further comprising failure sensing means that monitors bus cycles in a period during which a bus access signal is given to a bus master and that, when the bus cycles have not continued more than a specific number of cycles, senses that a failure has occurred in the bus master allowed to use the bus, and excludes the bus master from the objects of bus arbitration.

9. In a computer system where a PCI (Peripheral Component Interconnect) bus provided with bus masters is connected via a bus bridge unit to an ISA (Industry Standard Architecture) bus provided with bus masters, a bus arbiter connected to said PCI bus, comprising:

an arbitration circuit that arbitrates between the bus access request signals from said bus masters and outputs a bus access grant signal to a single bus master of said plurality of bus masters;

means for holding a value indicating the duration during which the switching of said bus access grant signal is to be inhibited;

counting means capable of counting on the basis of the value held in said holding means;

means for causing said counting means to start counting at the time when said arbitration circuit has given a bus access grant signal to a bus master;

means for inhibiting said arbitration circuit from switching the bus access grant signal in the period until said counting has been completed, as long as the bus access request signal from said bus master to which the bus access grant signal has been given remains active; and means for permitting said arbitration circuit to switch the access grant signal after said counting has been completed;

wherein said inhibiting means includes a circuit for masking a bus access grant signal outputted from said arbitration circuit.

10. A bus arbiter according to claim 9, wherein said holding means includes a register into which a value indicating said duration can be written in a programmable manner.

11. A bus arbiter according to claim 9, wherein said inhibiting means includes a circuit for masking a bus access request signal to be given to said arbitration circuit.

12. A bus arbiter according to claim 9, further comprising failure sensing means that monitors bus cycles in a period during which a bus access signal is given to a bus master and that, when the bus cycles have not continued more than a specific number of cycles, senses that a failure has occurred in the bus master allowed to use the bus, and excludes the bus master from the objects of bus arbitration.

* * * * *

UNITED STATES PATENT AND TRADEMARK OFFICE
CERTIFICATE OF CORRECTION

PATENT NO.   : 5,796,968
DATED        : August 18, 1998
INVENTOR(S)  : Takeshi TAKAMIYA It is certified that error appears in the above-indentified patent and that said Letters Patent is hereby corrected as shown below:

Claim 5, Col.13, line 1, "indicting" should read --indicating--.

Signed and Sealed this

Twenty-first Day of September, 1999

Attest:

Q. TODD DICKINSON

*Attesting Officer*    Acting Commissioner of Patents and Trademarks